UNITED STATES PATENT OFFICE.

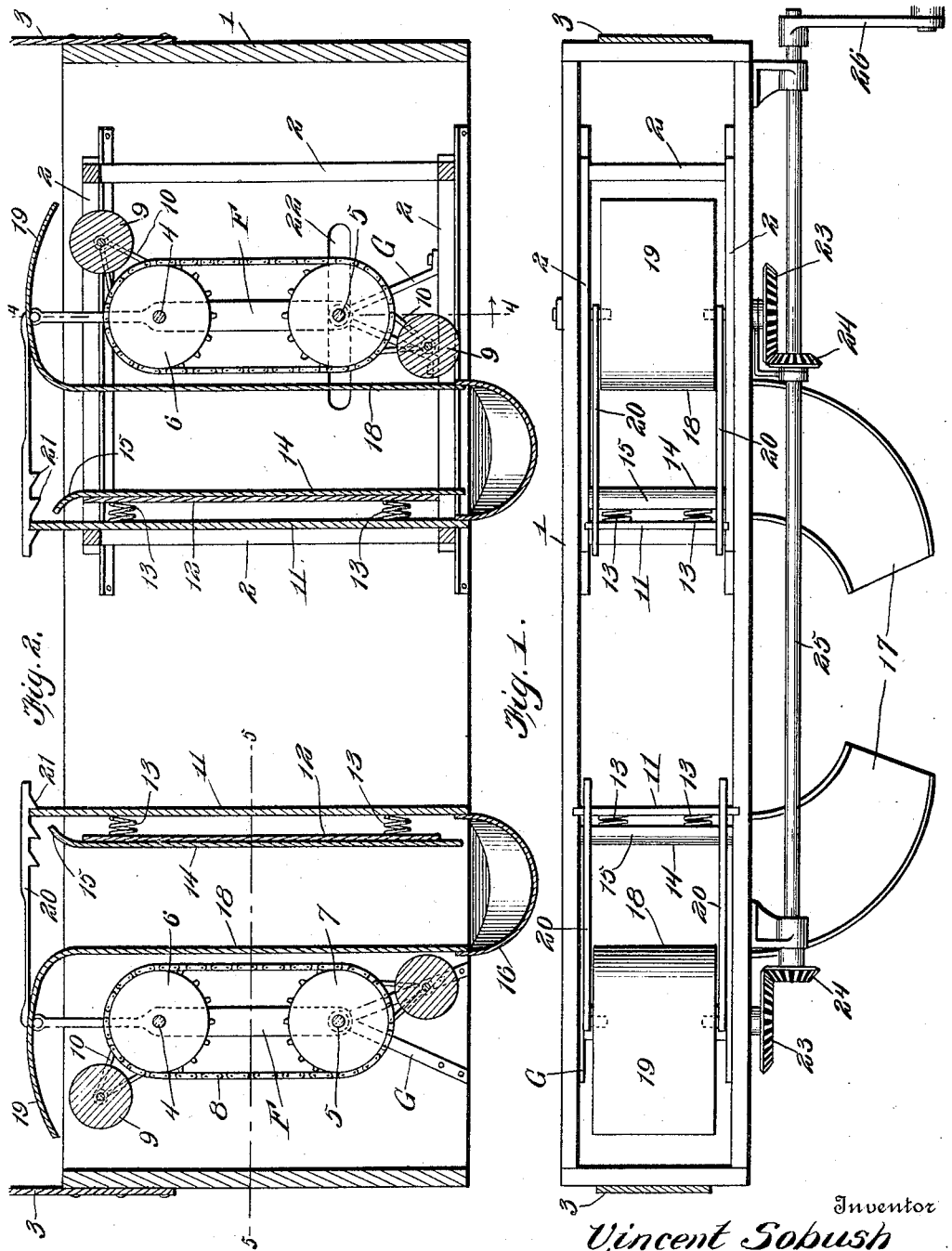

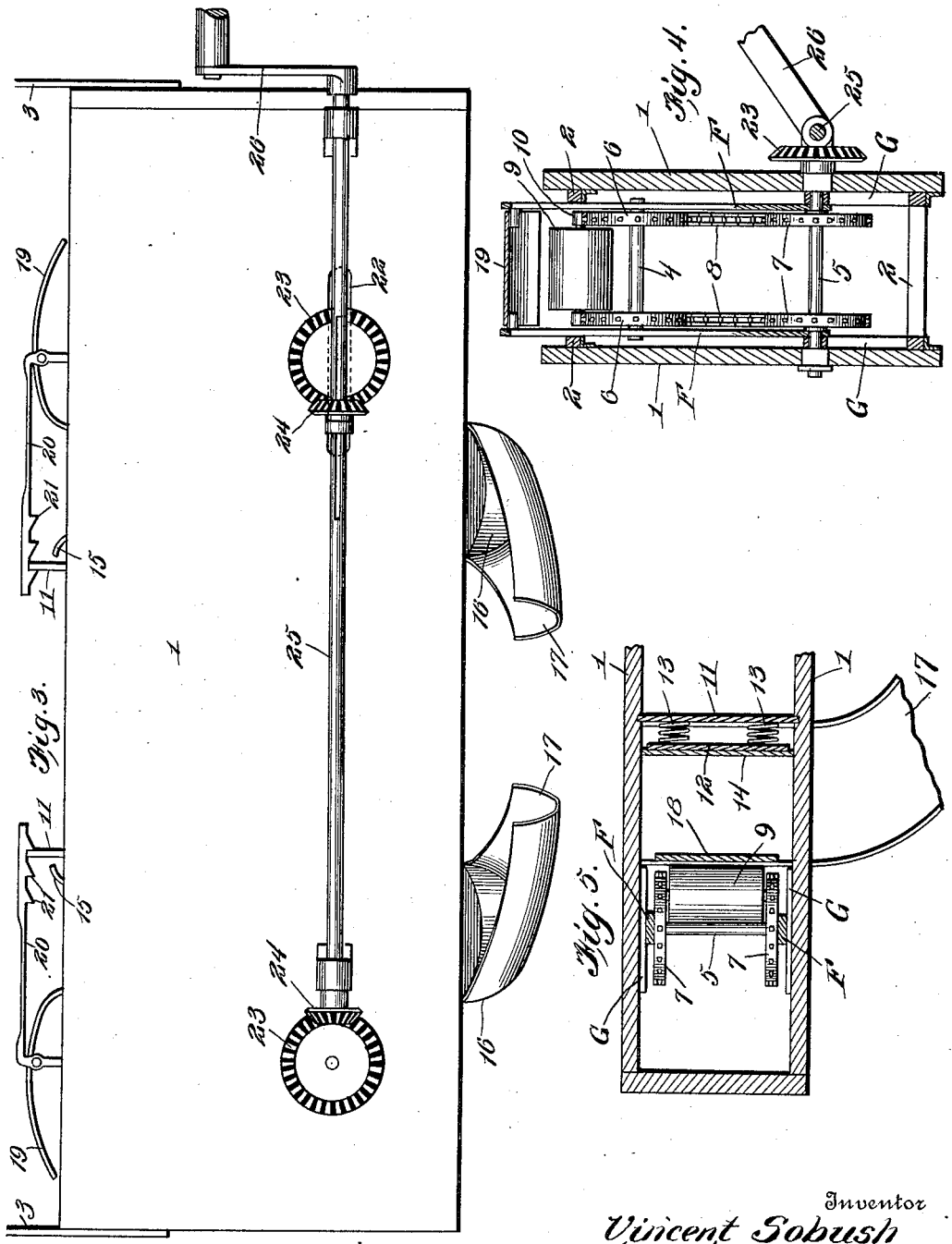

VINCENT SOBUSH, OF GREEN BAY, WISCONSIN.

MILKING-MACHINE.

1,091,974.  Specification of Letters Patent.  Patented Mar. 31, 1914.

Application filed December 17, 1912. Serial No. 737,262.

*To all whom it may concern:*

Be it known that I, VINCENT SOBUSH, a citizen of the United States, residing at Green Bay, in the county of Brown and State of Wisconsin, have invented new and useful Improvements in Milking-Machines, of which the following is a specification.

This invention relates to milking machines of that class in which a series of endless belts provided with teat-compressing rollers are juxtaposed to yieldable pressure plates for the purpose of squeezing and compressing the device so as to cause the milk to flow.

The invention has for its object to provide a simple and improved construction whereby the machine may be conveniently adjusted to milk bags or udders of various sizes.

A further object of the invention is to provide simple and improved means whereby adjustment with respect to the teats may be made.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a milking machine constructed in accordance with the invention. Fig. 2 is a longitudinal sectional view of the same. Fig. 3 is a side elevation. Fig. 4 is a transverse sectional view taken on the line 4—4 in Fig. 2. Fig. 5 is a horizontal sectional view taken on the line 5—5 in Fig. 2.

Corresponding parts in the several figures are denoted by like characters of reference.

1 designates an oblong frame or casing, between the side members of which an auxiliary frame 2 is slidably mounted. One teat-engaging milking device is supported in the frame or casing 1 adjacent to one end thereof, and another teat-engaging milking device, in all respects similar to the first mentioned one, is supported in the slidable frame 2 so as to be adjustable with respect to the first mentioned milking mechanism, thereby enabling the entire machine to be conveniently adjusted with respect to milk bags or udders of different dimensions. The frame or casing 1 is provided with straps 3 which may be extended across the back of the animal to support the device in position for operation. Each milking mechanism comprises a pair of shafts, namely, an upper shaft 4 and a lower shaft 5, said shafts being supported for rotation in frames F which are pivotally mounted on brackets G in the casing 1 and the sliding frame 2, respectively. The lower shafts 5 may constitute the pivots on which the frames F are mounted and whereby said frames are connected with the brackets G. Each shaft carries a pair of sprocket wheels 6, 7, over which link belts 8 are guided, said belts carrying rollers 9 which are supported by means of brackets 10. Supported stationary with respect to each pair of shafts 4, 5 is a wall or partition 11 carrying a pressure board 12 which is supported resiliently by means of springs 13; supported loosely and detachably with respect to each pressure board 12 is a shield 14, the upper edge of which has a curved flange 15 extending across the upper edge of the pressure board 12. Suitably supported adjacent to the lower edge of each partition 11 is a trough 16 that extends transversely of the casing to receive the milk; the troughs 16 of the two milking devices are provided with discharge spouts 17. Each frame F carries a loosely supported shield 18 having at its upper edge a curved flange 19 extending across the roller carrying link belts so as to be engaged by the rollers 9, which latter will serve to force the shield 18 in the direction of the shield 14 when the device is in operation, as will be readily understood.

Each frame F is equipped with a spring clasp 20 having ratchet teeth 21 adapted to engage the upper edge of the wall or partition 11 for the purpose of supporting the frame in adjusted position with relation to said partition.

The lower shafts 5 extend through the side walls of the casing 1, said side walls being provided with slots 22 for the passage of that shaft which is associated with the slidable frame 2. The projecting ends of the shafts 5 are provided with gear wheels 23 to receive motion from corresponding gear wheels 24 on an operating shaft 25 having a crank 26 whereby it may be rotated. It is obvious that the gear wheel intermeshing with the gear wheel 23 on that shaft 5 which is associated with the movable frame 2 must be slidably or movably mounted on the operating shaft 25 with which it is connected in any convenient and well known manner; also that the relative sizes of the gear wheels 23 and 24 may be varied to provide the desired speed.

From the foregoing description, taken in connection with the drawings hereto annexed, it is readily apparent that the improved milking machine may be easily adjusted to milk bags or udders of various sizes, the slidable frame 2 within the casing 1 accommodating itself to such adjustment. After placing the teats between the shields 14 and 18, which may readily be done without injury owing to the curved and oppositely flared upper edges of said shields, the frames F may be quickly adjusted with respect to the teats by means of the tooth-carrying spring catches 20. When the operating shaft is rotated, motion is transmitted through the shafts 5 to the link belts carrying the rollers 9 which serve to compress the teats in the customary manner to expel the milk.

The machine is extremely simple in construction, and the working parts thereof, especially the teat-engaging shields 14 and 18 which are loosely and detachably supported, may be easily kept in a perfectly clean and sanitary condition.

Having thus described the invention, what is claimed as new, is:—

1. In a milking machine, a casing, a teat-compressing milking device supported in said casing adjacent to one end thereof, a frame supported slidably in the casing, a teat-engaging milking device supported in said frame, and means whereby the two milking devices may be simultaneously actuated.

2. In a milking machine, a casing, a pivotally supported frame, shafts supported for rotation with respect to said frame, sprocket wheels on said shafts, link belts guided over the sprockets, compression rollers carried by the link belts, a partition supported stationary with respect to the frame, a resiliently supported pressure board carried by the partition, loosely supported teat-engaging shields, and means for adjustably supporting the free end of the pivoted frame with respect to the stationary partition.

3. In a milking machine, a resiliently supported pressure board, a pivotally supported frame, shafts mounted for rotation with respect to said frame, endless belts guided over said shafts, compression rollers carried by said belts, and teat-engaging shields supported loosely between the pressure board and the pivoted frame and having oppositely curved flanges at their upper ends.

4. In a milking machine, a casing, a resiliently supported pressure board, suitably supported endless belts, pressure rollers carried by said belts, teat-engaging shields supported loosely between the pressure board and the roller carrying belts, said shields being provided with curved flanges at their upper edges, and milk receiving troughs supported adjacent to the lower ends of the shields.

5. In a milking machine, an auxiliary frame supported in said main frame for longitudinal sliding movement therein, a milking device supported in the main frame and including a resiliently supported pressure board, a tiltable frame, a shaft supporting said frame, a second shaft supported for rotation in said frame, endless elements guided around said shafts, and shields supported loosely between the endless elements and the pressure board, a similar milking device supported in the auxiliary frame, and means for simultaneously actuating the two milking devices irrespective of the position of the auxiliary frame.

6. In a milking machine, the combination with a suitable supporting frame, of a stationary partition, a resilient pressure board adjacent to said partition, brackets, a shaft supported for rotation in said brackets, frames tiltably mounted on said shaft, a second shaft supported for rotation in the frames in parallel relation to the first shaft, sprocket wheels on said shafts, link belts trained over the sprocket wheels, compression rollers carried by said belts, and teat-engaging shields supported intermediate the endless belts and the pressure board.

In testimony whereof I affix my signature in presence of two witnesses.

VINCENT SOBUSH.

Witnesses:
ROSY EMPEY,
H. KIERNAN.